US009223980B1

(12) United States Patent
Bao

(10) Patent No.: US 9,223,980 B1
(45) Date of Patent: Dec. 29, 2015

(54) SYSTEMS AND METHODS FOR INDICATING MALWARE STATUSES OF ELECTRONIC MESSAGES

(71) Applicant: Symantec Corporation, Mountain View, CA (US)

(72) Inventor: Linjiang Bao, Beijing (CN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/301,949

(22) Filed: Jun. 11, 2014

(51) Int. Cl.
*G06F 21/56* (2013.01)

(52) U.S. Cl.
CPC ............ *G06F 21/566* (2013.01); *G06F 21/561* (2013.01)

(58) Field of Classification Search
CPC .................................................... H04L 63/145
USPC ............................................................ 726/24
See application file for complete search history.

(56) References Cited

U.S. PATENT DOCUMENTS

| | | | | |
|---|---|---|---|---|
| 6,094,731 | A * | 7/2000 | Waldin et al. ............... | 714/38.14 |
| 6,873,988 | B2 * | 3/2005 | Herrmann et al. ..................... | 1/1 |
| 7,673,342 | B2 * | 3/2010 | Hursey et al. .................... | 726/24 |
| 8,381,298 | B2 * | 2/2013 | Blumfield et al. ............... | 726/24 |
| 8,819,823 | B1 * | 8/2014 | Banerjee .......................... | 726/23 |
| 2002/0147780 | A1 * | 10/2002 | Liu et al. ........................ | 709/206 |

OTHER PUBLICATIONS

Zhao Han; Systems and Methods for Customizing Privacy Control Systems; U.S. Appl. No. 14/281,859, filed May 19, 2014.
"Malware", http://en.wikipedia.org/wiki/Malware, as accessed Apr. 21, 2014, Wikipedia, (Jan. 5, 2004).
"What is an Email Header?", http://whatismyipaddress.com/email-header, as accessed Apr. 21, 2014, What Is My IP Address, (Nov. 30, 2010).

* cited by examiner

*Primary Examiner* — Teshome Hailu
*Assistant Examiner* — Thanh Le
(74) *Attorney, Agent, or Firm* — ALG Intellectual Property, LLC

(57) ABSTRACT

The disclosed computer-implemented method for indicating malware statuses of electronic messages may include (1) determining that a user is attempting to distribute an electronic message, (2) scanning the electronic message to determine a malware status of the electronic message, (3) before distributing the electronic message, including, with the electronic message, an indication of the malware status of the electronic message, and (4) after including the indication of the malware status with the electronic message, distributing the electronic message to a recipient system, where the recipient system uses the malware status included with the electronic message to determine the malware status of the electronic message. Various other methods, systems, and computer-readable media are also disclosed.

20 Claims, 7 Drawing Sheets

SYSTEMS AND METHODS FOR INDICATING MALWARE STATUSES OF ELECTRONIC MESSAGES

BACKGROUND

In order to prevent the distribution of spam, malware, and other unsolicited and potentially harmful material, many devices and messaging services may scan outgoing messages for malicious content before they are sent to intended recipients. By scanning outgoing messages, traditional anti-malware technologies may detect infected machines, prevent the spread of malware, and may also protect against malicious data loss.

Many traditional anti-malware solutions may also scan incoming electronic messages for malware. By scanning incoming electronic messages, such solutions may protect recipient devices and networks from being adversely affected by malware.

Unfortunately, conducting malware scans may slow electronic message transmission times and may consume important computing resources—issues that may be compounded when an electronic message is scanned by both a sending device and a receiving device. As such, the current disclosure identifies and addresses a need for more efficient and effective systems and methods for identifying and indicating malware within electronic messages.

SUMMARY

As will be described in greater detail below, the instant disclosure describes various systems and methods for indicating malware statuses of electronic messages by including, with an electronic message, an indication of a malware status of the message. Once the message is received at its intended destination, a recipient of the message may identify the indication included with the message and use the indication to determine the malware status of the message instead of rescanning the message.

In one example, a computer-implemented method for indicating malware statuses of electronic messages may include (1) determining that a user is attempting to distribute an electronic message, (2) scanning the electronic message to determine a malware status of the electronic message, (3) before distributing the electronic message, including, with the electronic message, an indication of the malware status of the electronic message, and (4) after including the indication of the malware status with the electronic message, distributing the electronic message to a recipient system, where the recipient system uses the malware status included with the electronic message to determine the malware status of the electronic message.

In some examples, the malware status of the electronic message may indicate that the electronic message does not contain any malicious content, that the electronic message contains potentially malicious content, that malicious content within the electronic message has been removed, and/or that malicious content within the electronic message has been quarantined. Additionally, in some examples, the recipient system may include a client system with a messaging account to which the electronic message was distributed and/or an anti-malware engine responsible for scanning electronic messages received by the messaging account.

In some embodiments, the indication of the malware status of the electronic message may further include information indicating a name of an anti-malware engine used to scan the electronic message for malicious content and/or information about malware definitions used by the anti-malware engine. In such embodiments, the information about the malware definitions used by the anti-malware engine may include a timestamp indicating when the anti-malware engine scanned the electronic message for malicious content and/or version information that indicates a version of the malware definitions used by the anti-malware engine. Furthermore, in such embodiments the method may include (1) identifying, at the recipient system, the information that indicates the version of the malware definitions used to scan the electronic message, (2) determining that the anti-malware engine has been updated with a new version of malware definitions since the anti-malware engine scanned the electronic message, and (3) re-scanning, at the recipient system, the electronic message for malicious content based on the determination that the anti-malware engine has been updated.

In some examples, determining that the user is attempting to distribute the electronic message may include determining that the user has created at least a portion of the electronic message. Additionally or alternatively, determining that the user is attempting to distribute the electronic message may include intercepting the electronic message before the electronic message is distributed to the recipient system.

In some embodiments, scanning the electronic message to determine the malware status of the electronic message may include identifying results of a malware scan previously performed on the electronic message. Additionally or alternatively, scanning the electronic message to determine the malware status of the electronic message may include prompting an anti-malware engine to scan the electronic message for malicious content.

In some examples, including the indication with the electronic message may include inserting a field containing the indication into a header of the electronic message. In addition, in some embodiments the method may further include encrypting the indication with a private key. Then, before the recipient uses the malware status included with the electronic message, the recipient system may verify the indication by decrypting the indication with a public key that corresponds to the private key.

In one embodiment, a system for implementing the above-described method may include (1) a determination module that determines that a user is attempting to distribute an electronic message, (2) a scanning module that scans the electronic message to determine a malware status of the electronic message, (3) an inclusion module that before distributing the electronic message, includes, with the electronic message, an indication of the malware status of the electronic message, and (4) a distribution module that, after including the indication of the malware status with the electronic message, distributes the electronic message to a recipient system, where the recipient system uses the malware status included with the electronic message to determine the malware status of the electronic message. In addition, the system may include at least one processor that executes the determination module, the scanning module, the inclusion module, and the distribution module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine that a user is attempting to distribute an electronic message, (2) scan the electronic message to determine a malware status of the electronic message, (3) before distributing the electronic message, include, with the electronic message, an indication of the malware status of the electronic message, and (4) after including the indication of the malware status with the electronic message, distribute the electronic message to a recipient system, where the recipient system uses the malware status included with the electronic message to determine the malware status of the electronic message.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
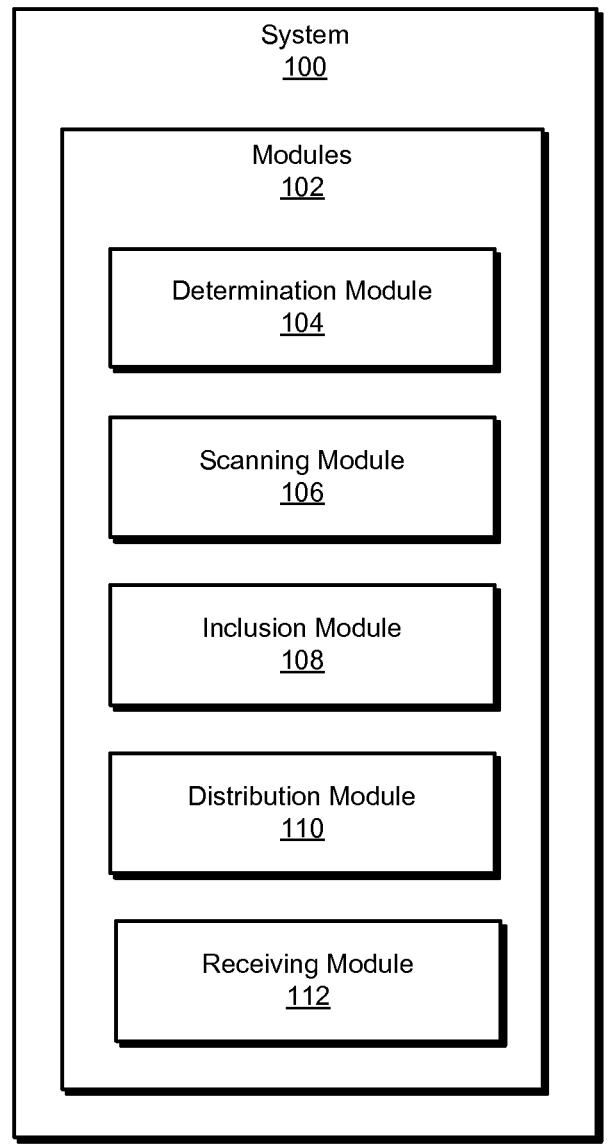
FIG. 1 is a block diagram of an exemplary system for indicating malware statuses of electronic messages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for indicating malware statuses of electronic messages. As will be explained in greater detail below, by including an indication of the malware status of an electronic message with the electronic message, the systems and methods described herein may quickly and efficiently communicate the malware status to a recipient of the electronic message. In addition, by identifying the indication of the malware status of the electronic message at a recipient system, the disclosed systems and methods may avoid scanning the electronic message for malicious content on a recipient's system, thereby improving transmission speed of the electronic message and reducing the consumption of resources for malware scanning.

Figure 2:
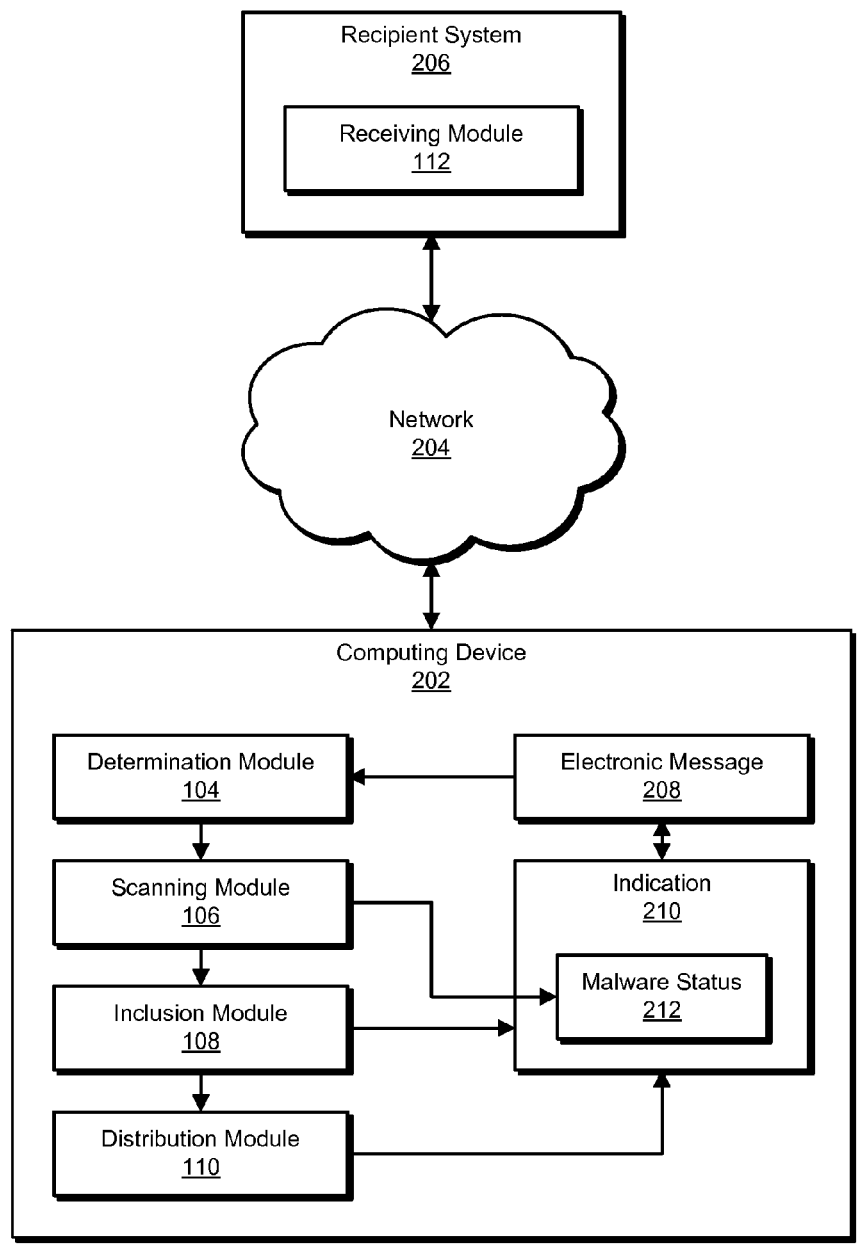
FIG. 2 is a block diagram of an additional exemplary system for indicating malware statuses of electronic messages.

The following will provide, with reference to FIGS. 1 and 2, detailed descriptions of exemplary systems for indicating malware statuses of electronic messages. Detailed descriptions of corresponding computer-implemented methods will also be provided in connection with FIG. 3. In addition, detailed descriptions of indications of malware statuses will be provided in connection with FIG. 4. Furthermore, detailed descriptions of notifications to recipients of electronic messages will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for indicating malware statuses of electronic messages. As illustrated in this figure, exemplary system 100 may include one or more modules 102 for performing one or more tasks. For example, and as will be explained in greater detail below, exemplary system 100 may include a determination module 104 that determines that a user is attempting to distribute an electronic message. Exemplary system 100 may also include a scanning module 106 that scans the electronic message to determine a malware status of the electronic message.

In addition, and as will be described in greater detail below, exemplary system 100 may include an inclusion module 108 that before distributing the electronic message, includes, with the electronic message, an indication of the malware status of the electronic message. Furthermore, exemplary system 100 may include a distribution module 110 that after including the indication of the malware status with the electronic message, distributes the electronic message to a recipient system. Finally, exemplary system 100 may include a receiving module 112 that identifies, at the recipient system, the indication of the malware status of the electronic message. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or recipient system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a recipient system 206 via a network 204. In one example, computing device 202 may be programmed with one or more of modules 102. In this example, the modules hosted on computing device 202 may identify electronic messages distributed from computing device 202 and/or mark electronic messages distributed from computing device 202 with an indication of their malware status. Additionally or alternatively, recipient system 206 may be programmed with one or more of modules 102. In these examples, the modules hosted on recipient system 206 may identify indications of the malware status of electronic messages received by recipient system 206 and/or scan electronic messages received by recipient system 200 for malicious content.

In one embodiment, one or more of modules 102 from FIG. 1 may, when executed by at least one processor of computing device 202 and/or recipient system 206, enable computing device 202 and/or recipient system 206 to indicate malware statuses of electronic messages. For example, and as will be described in greater detail below, determination module 104 may cause computing device 202 and/or recipient system 206 to determine that a user is attempting to distribute an electronic message (e.g., electronic message 208). Next, scanning module 106 may cause computing device 202 and/or recipient system 206 to scan the electronic message to determine a malware status (e.g., malware status 212) of the electronic message. In addition, before distributing the electronic message, inclusion module 108 may cause computing device 202 and/or recipient system 206 to include, with the electronic message, an indication (e.g., indication 210) of the malware status of the electronic message. Finally, after including the indication of the malware status with the electronic message, distribution module 110 may cause computing device 202 and/or recipient system 206 to distribute the electronic message to a recipient system (e.g., recipient system 206), which may use the malware status included with the electronic message to determine the malware status of the electronic message.

Computing device 202 generally represents any type or form of computing device capable of distributing electronic messages and/or scanning electronic messages for malicious content. In addition, recipient system 206 generally represents any type or form of computing device, gateway device (e.g., router), anti-malware engine, and/or messaging service that is capable of receiving electronic messages and/or scanning electronic messages for malicious content. In some examples, recipient system 206 may represent a gateway device that receives electronic messages and then distributes the messages to an intended recipient.

Figure 6:
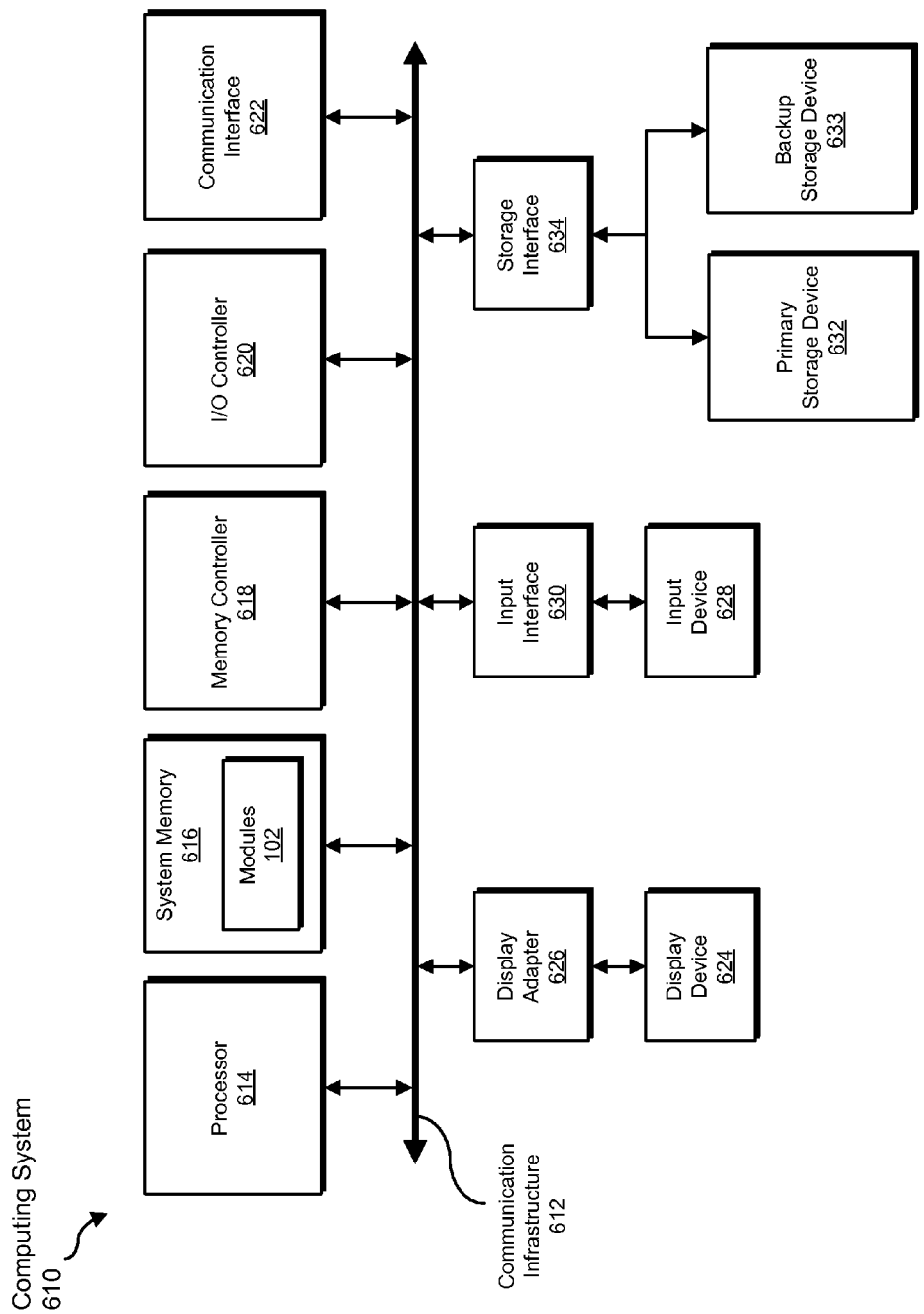
FIG. 6 is a block diagram of an exemplary computing system capable of implementing one or more of the embodiments described and/or illustrated herein.

Examples of computing device 202 and recipient system 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, applications servers, database servers, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and recipient system 206.

Figure 3:
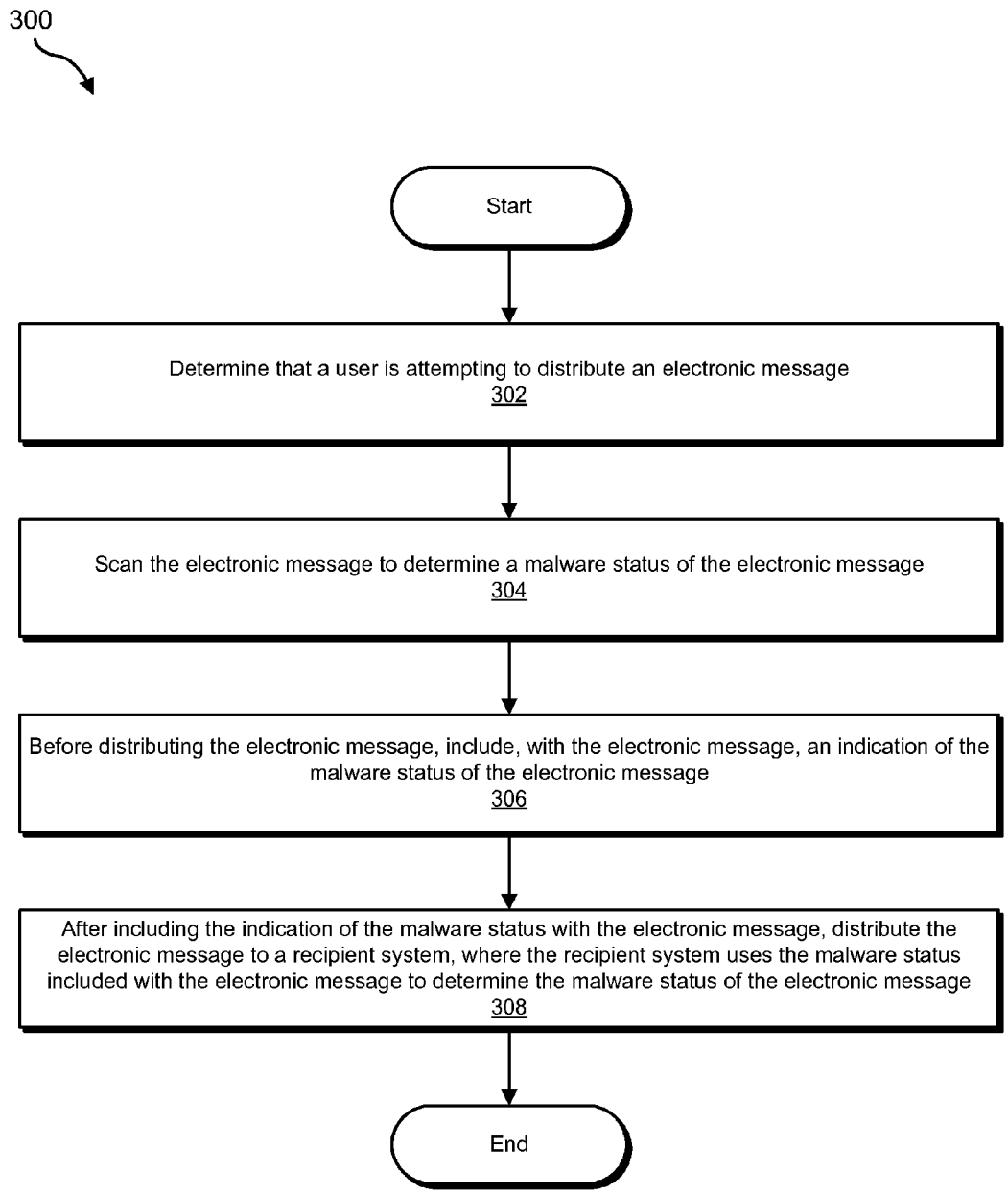
FIG. 3 is a flow diagram of an exemplary method for indicating malware statuses of electronic messages.

FIG. 3 is a flow diagram of an exemplary computer-implemented method 300 for indicating malware statuses of electronic messages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may determine that a user is attempting to distribute an electronic message. For example, determination module 104 may, as part of computing device 202 in FIG. 2, determine that the user is attempting to distribute electronic message 208.

The term "electronic message," as used herein, generally refers to any type or form of digital communication, data, or message transferred from one system to another. Examples of electronic messages include, without limitation, emails, email attachments, text messages, instant messages, tweets, social networking messages, combinations of one or more of the same, and/or any other form of electronic message.

The systems described herein may determine that the user is attempting to distribute the electronic message in a variety of ways. In some examples, determination module 104 may determine that the user has created some or all of electronic message 208. For example, determination module 104 may monitor an electronic messaging account managed by the user to determine that the user has entered text into the body of a new electronic message and/or that the user has uploaded one or more attachments to be sent along with electronic message 208.

Additionally or alternatively, determination module 104 may determine that the user is attempting to distribute electronic message 208 by intercepting electronic message 208 before electronic message 208 is distributed to recipient system 206. For example, determination module 104 may determine that the user has finished creating electronic message 208 and has directed (e.g., by clicking a "send" button) an electronic messaging service to distribute electronic message 208 to recipient system 206 (e.g., via network 204). In general, determination module 104 may determine that the user is attempting to distribute electronic message 208 at any point before electronic message 208 arrives at recipient system 206.

Returning to FIG. 3, at step 304 one or more of the systems described herein may scan the electronic message to determine a malware status of the electronic message. For example, scanning module 106 may, as part of computing device 202 in FIG. 2, scan electronic message 208 to determine malware status 212.

The term "malware status," as used herein, generally refers to any state or categorization that denotes, signifies, or otherwise informs a user, entity, anti-malware engine, recipient system, network gateways system (e.g., router), and/or software installed on a recipient system of the presence of malicious content and/or action taken against malicious content within an electronic message. In some examples, and as will be explained in greater detail below, a malware status may represent the results of a malware scan performed on the electronic message.

In addition, the phrases "malicious content" and "malware," as used herein, generally refer to any type or form of harmful and/or unsolicited file, software, or executable code that tracks user activity, accesses confidential information, and/or otherwise negatively affects the functionality of a computing device. Examples of malicious content and malware include, without limitation, computer viruses and worms, adware, spyware, scareware, ransomware, spam, and phishing attacks. In some examples, malware may be distributed intentionally or inadvertently in an electronic message and/or as an attachment to an electronic message.

The systems described herein may determine the malware status of an electronic message in a variety of ways. In some examples, scanning module 106 may identify results of a malware scan previously performed on electronic message 208. For example, the computing device and/or messaging service used to create electronic message 208 may, automatically and/or under direction of a user, trigger an anti-malware engine to scan electronic message 208 for malicious content. In this example, scanning module 106 may simply identify the results of the analysis performed by the anti-malware engine. Alternatively, if an anti-malware engine has not previously scanned electronic message 208 for malicious content, scanning module 106 may prompt the anti-malware engine to scan electronic message 208. In some examples, the anti-malware engine may be hosted as part of or alongside scanning module 106 on computing device 202. In addition, scanning module 106 may send electronic message 208 to an anti-malware engine hosted on a remote computing device (e.g., an anti-malware server or backend) for scanning and may receive a result of the scan from the remote device.

An anti-malware engine may scan electronic message 208 for malicious content in a variety of ways. In some examples, an anti-malware engine may analyze electronic message 208 for indications of known types of malware. Specifically, an anti-malware engine may search electronic message 208 for specific strings and/or portions of code (e.g., malware "definitions" or "signatures") that correspond to specific instances or categories of malware. Additionally or alternatively, an anti-malware engine may execute electronic message 208 in a virtual execution environment in order to identify malicious behaviors and/or undesirable side effects of electronic message 208.

Once electronic message 208 has been analyzed by an anti-malware engine, scanning module 106 may determine malware status 212 based on the results of the analysis. For example, scanning module 106 may determine that electronic message 208 does not contain any malicious content based on the anti-malware engine not identifying any malware signatures or malicious behavior associated with electronic message 208. Therefore, scanning module 106 may assign electronic message 208 a malware status such as "clean" or "good." In other examples, scanning module 106 may determine that electronic message 208 contains potentially malicious content and may therefore assign electronic message 208 a malware status such as "potentially harmful." Furthermore, scanning module 106 may determine that the anti-malware engine identified and removed at least one malicious file within electronic message 208 and may therefore assign electronic message 208 a malware status such as "removed" or "cleaned." Additionally, scanning module 106 may determine that the anti-malware engine quarantined or partitioned at least one malicious file within electronic message 208 and may therefore assign electronic message 208 a malware status such as "quarantined." In general, scanning module 106 may assign malware status 212 as any suitable status or combination of statuses that accurately and efficiently reflect the malware status of electronic message 208.

Returning to FIG. 3, at step 306 one or more of the systems described herein may include, with the electronic message, an indication of the malware status of the electronic message before the electronic message is distributed. For example, before distributing electronic message 208, inclusion module 108 may, as part of computing device 202 in FIG. 2, include indication 210 with electronic message 208.

The term "indication," as used herein, generally refers to any type or form of mark, label, flag, or association that contains or suggests the malware status of an electronic message. In some examples, an indication may be received and/or identified by an electronic messaging service, an anti-malware engine, a recipient system, and/or a user of a recipient system.

The systems described herein may include indication 210 with electronic message 208 in a variety of ways. In some examples, inclusion module 108 may automatically include indication 210 in response to scanning module 106 determining malware status 212. In other examples, indication 210 may represent a user-defined input field. In these examples, inclusion module 108 may allow and/or direct the user that created electronic message 208 to include indication 210 with electronic message 208, as well as allowing and/or directing the user to select which information to include within indication 210.

Figure 4:
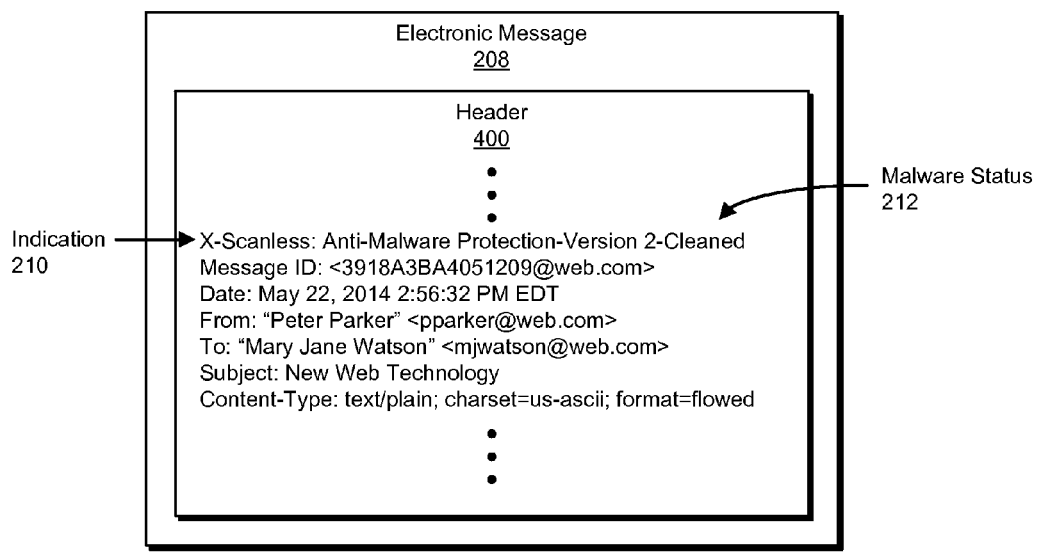
FIG. 4 is an illustration of an exemplary indication of a malware status of an electronic message.

In some examples, inclusion module 108 may include indication 210 in electronic message 208 by inserting indication 210 into a field within a header of electronic message 208. For example, inclusion module 108 may create the field within the header of electronic message 208 and insert malware status 212, as well any additional information about the anti-malware engine, into the field. As an example, FIG. 4 shows header 400 within electronic message 208. As shown in FIG. 4, header 400 may include indication 210. In some examples, the field containing indication 210 may be represented by a label (in this example, "X-Scanless") and the field value may contain a name of the anti-malware engine used to scan electronic message 208 (in this example, "Anti-Malware Protection"), a version of the malware definitions used by the anti-malware engine (in this example, "Version 2"), and malware status 212 (in this example, "cleaned").

Also as shown in FIG. 4, header 400 may additionally include a message ID (in this example, "3918A3BA4051209@web.com"), a date and time that electronic message 208 was created (in this example, "May 22, 2014 2:56:32 PM EDT"), the name and email address of who electronic message 208 is from (in this example, "Peter Parker" and "pparker@web.com"), the name and email address to whom electronic message 208 is directed (in this example, "Mary Jane Watson" and "mjwatson@web.com"), the subject of electronic message 208 (in this example, "New Web Technology,") and the content type of electronic message 208 (in this example, "text/plain; charset=us-ascii; format=flowed"). In some embodiments, header 400 may include additional information, such as a Multipurpose Internet Mail Extension (MIME) version, a return path (e.g., an email address to which replies to electronic message 208 will be directed), information indicating when and which servers and/or messaging accounts received electronic message 208 while electronic message 208 is routed to recipient system 206, additional user-defined fields, additional information indicating properties of electronic message 208, and/or any other suitable information.

In some embodiments, inserting indication 210 into the header of electronic message 208 may allow recipient system 206 to quickly identify malware 212 upon receiving electronic message 208. However, inclusion module 108 may include indication 210 with electronic message 208 in a variety of other ways. For example, inclusion module 108 may insert indication 210 into the body of electronic message 208, include indication 210 as an attachment within electronic message 208, send indication 210 in an additional message directed to recipient system 206, and/or include indication 210 with electronic message 208 in any other manner.

As shown above, in addition to including malware status 212, indication 210 may include supplementary information related to malware status 212. For example, inclusion module 108 may include, within indication 210, information indicating a name of the anti-malware engine used to scan electronic message 208. Additionally or alternatively, indication 210 may include information about malware definitions used by the anti-malware engine. In some embodiments, the information about the malware definitions used by the anti-malware engine may include version information that indicates a version of the malware definitions and/or a timestamp indicating when the anti-malware engine scanned electronic message 208. In general, indication 210 may include any information associated with the anti-malware engine and/or malware scan used to analyze electronic message 208.

Furthermore, in some examples, inclusion module 108 may encrypt indication 210 before distributing electronic message 208 to recipient system 206. For example, inclusion module 108 may encrypt indication 210 (e.g., as well as some or all remaining portions of electronic message 208) with a private key. The term "private key," as used herein, generally refers to one half of a pair of inverse cryptographic algorithms used to securely encrypt and decrypt data. A private key may represent the confidential half of the cryptographic pair and may therefore only be known to authorized entities. In contrast, a public key, representing the other half of the key pair, may be readily accessed by any entity. Data encrypted using the one half of the key pair may be decrypted using the other half of the key pair. As such, data encrypted with the private key may be guaranteed to originate from authorized entities. As will be explained in greater detail below, encrypting indication 210 with a private key may enable recipient system 206 to verify the validity of indication 210.

Returning to FIG. 3, at step 308 one or more of the systems described herein may, after including the indication of the malware status with the electronic message, distribute the electronic message to a recipient system, where the recipient system uses the malware status included with the electronic message to determine the malware status of the electronic message. For example, distribution module 110 may, as part of computing device 202 in FIG. 2, distribute electronic message 208 to recipient system 206 after including indication 210 with electronic message 208. Receiving module 112 may then use malware status 212 to determine the malware status of electronic message 208.

The systems described herein may distribute the electronic message with the indication to the recipient system in a variety of ways. For example, distribution module 110 may distribute electronic message 208 to recipient system 206 at any point after inclusion module 108 includes indication 210 with electronic message 208. In one embodiment, distribution module 110 may automatically distribute electronic message 208 in response to inclusion module 108 including indication 210 with electronic message 208. In another embodiment, distribution module 110 may wait to distribute electronic message 208 until the user that created electronic message 208 initiates sending electronic message 208 to recipient system 206.

In some examples, recipient system 206 may represent a client system with a messaging account to which electronic message 208 was distributed. Additionally or alternatively, recipient system 206 may represent an anti-malware engine responsible for scanning electronic messages received by the messaging account and/or a gateway system that transmits the electronic message to its final destination. In general, recipient system 206 may represent any computing device and/or software associated with receiving electronic message 208. In some examples, recipient system 206 may host receiving module 112 (as well as any additional modules described herein). In these examples, once distribution module 110 distributes electronic message 208, receiving module 112 may identify indication 210 included with electronic message 208.

The systems described herein may identify indication 210 at recipient system 206 in a variety of ways. For example, receiving module 112 may identify indication 210 when electronic message 208 is received by recipient system 206 and/or when a user of recipient system 206 attempts to open electronic message 208. Referring to the example of FIG. 4, receiving module 112 may scan header 400 of electronic message 208 to identify the "X-Scanless" field label. In additional examples, receiving module 112 may refer to the body of electronic message 208, attachments included with electronic message 208, and/or additional electronic messages distributed with electronic message 208 to identify indication 210. Once receiving module 112 identifies indication 210 within electronic message 208, receiving module 112 may identify malware status 212 within indication 210. Referring again to the example of FIG. 4, receiving module 112 may identify the malware status of "cleaned" within indication 210.

In some examples, receiving module 112 may receive an electronic message distributed to recipient system 206 that does not contain an indication of the malware status of the electronic message. For example, receiving module 112 may identify an electronic message that was distributed directly to recipient system 206 without having been scanned for malicious content. In response to identifying the electronic message, receiving module 112 may attempt to identify an indication of the malware status of the electronic message by recommending that the recipient system perform a malware scan on the electronic message or automatically directing an anti-malware engine to scan the electronic message.

In some embodiments, identifying malware status 212 with electronic message 208 may directly indicate the malware status of electronic message 208. In other words, identifying malware status 212 may indicate to receiving module 112 that recipient system 206 does not have to and/or should not scan electronic message 208 for malicious content, as the malware status of electronic message 208 is already known. In these examples, receiving module 112 may report the identified malware status 212 to recipient system 206 and/or a user of the messaging account to which electronic message 208 was distributed (e.g., rather than directing an anti-malware engine to re-scan electronic message 208).

However, in some embodiments, the systems described herein may determine that an additional malware scan of electronic message 208 may be beneficial. For example, in addition to identifying malware status 212 within indication 210, receiving module 112 may identity the information that indicates the version of the malware definitions used to scan electronic message 208 and/or the timestamp that indicates when the anti-malware engine scanned electronic message 208. In this example, receiving module 112 may determine that the anti-malware engine has been updated with a new version of malware definitions since the anti-malware engine scanned the electronic message. For example, the timestamp within indication 210 may indicate that electronic message 208 was scanned two days before recipient system 206 received electronic message 208. In addition, receiving module 112 may determine that the anti-malware engine used to scan electronic message 208 was updated with a new version of malware definitions one day before recipient system 206 received electronic message 208. Therefore, receiving module 112 may determine that the malware definitions originally used to scan electronic message 208 for malicious content are out-of-date. In response to determining that the malware definitions are out-of-date, receiving module 112 may re-scan electronic message 208 at recipient system 206 to determine the most accurate and up-to-date malware status of electronic message 208.

In some examples, receiving module 112 may determine that inclusion module 108 encrypted indication 210 with a private key. In these examples, receiving module 112 may decrypt indication 210 with a public key that corresponds to the private key. In this way, receiving module 112 may verify that indication 210 represents legitimate information about the malware status of electronic message 208. For example, by decrypting indication 210 with the public key, receiving module 112 may determine that indication 210 was included with electronic message 208 by inclusion module 108 rather than being forged by a malicious user.

Additionally, in some embodiments, receiving module 112 may determine whether recipient system 206 and/or a user of recipient system 206 should have access to electronic message 208 based on malware status 212. For example, if malware status 212 indicates that electronic message 208 contains or potentially contains malicious content that has not been quarantined or removed, receiving module 112 may warn and/or block the user from accessing electronic message 208 until verifying that electronic message 208 does not contain malicious content and/or removing the malicious content from electronic message 208. In other examples, if receiving module 112 determines that electronic message 208 does not contain malicious content (e.g., malware status 212 indicates that electronic message is clean or that malicious content has been removed or quarantined) receiving module 112 may automatically permit a user of recipient system 206 to open, download, or otherwise access the contents of electronic message 208.

Figure 5:
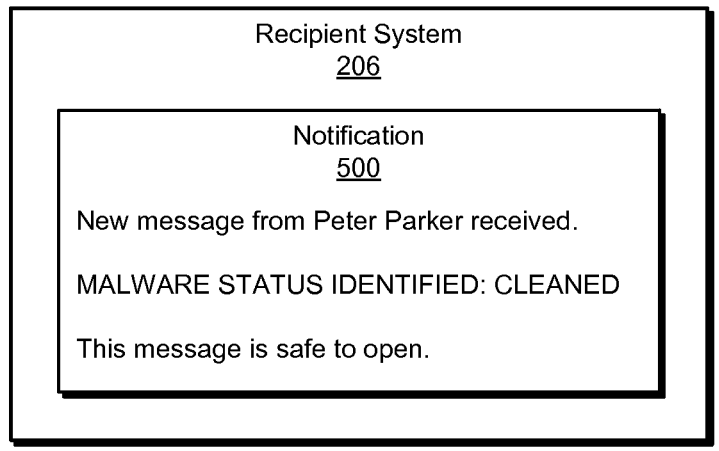
FIG. 5 is an illustration of an exemplary notification to a recipient of an electronic message.

In some examples, receiving module 112 may present malware status 212, as well as any determinations made based on malware status 212, to the user via a graphical user interface. As an example, FIG. 5 shows notification 500 presented to the user of recipient system 206. As shown in FIG. 5, notification 500 alerts the user that recipient system 206 received electronic message 208 from Peter Parker and that the malware status of electronic message 208 was identified as "cleaned." Furthermore, notification 500 notifies the user that electronic message 208 is safe to open.

The systems and methods described herein may be implemented in a variety of ways and provide a number of advantages. For example, by marking an electronic message with an indication of its malware status before the message is distributed, the disclosed systems and methods may efficiently communicate the absence, existence, and/or nature of malicious content within the message to a recipient of the message. As a result, the systems and methods described herein may reduce the time and computing resources consumed by the recipient system by eliminating and/or reducing the need to re-scan messages at the recipient system.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
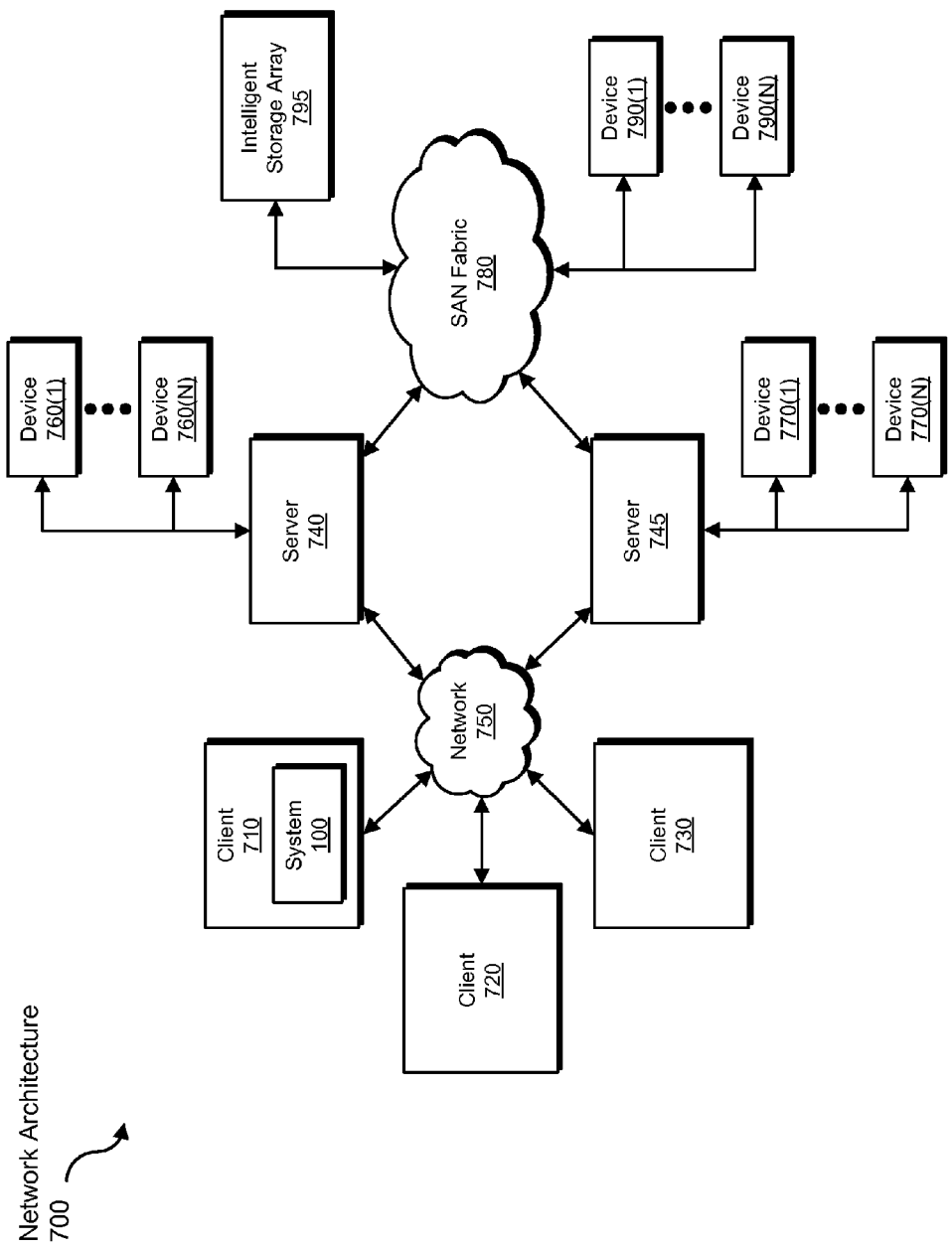
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for indicating malware statuses of electronic messages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information indicating the malware status of an electronic message, transform the information, output a result of the transformation to a recipient system, and use the result of the transformation to identify the malware status of the electronic message at the recipient system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for indicating malware statuses of electronic messages, at least a portion of the method being performed by a computing device comprising at least one processor, the method comprising:
   determining that a user of a client device is attempting to distribute an electronic message that the user at least partially created at the client device;
   scanning, by the client device of the user, the electronic message to determine a malware status of the electronic message;
   before distributing the electronic message, including, by the client device of the user, with the electronic message, a result of the malware scan performed on the electronic message;
   after including the result of the malware scan performed on the electronic message with the electronic message, distributing the electronic message to a client device of an additional user, where the client device of the additional user uses the result of the malware scan included with the electronic message to determine the malware status of the electronic message.

2. The method of claim 1, wherein the result of the malware scan performed on the electronic message indicates at least one of:
   the electronic message does not contain any malicious content;
   the electronic message contains potentially malicious content;
   malicious content within the electronic message has been removed; and
   malicious content within the electronic message has been quarantined.

3. The method of claim 1, further comprising including, by the client device of the user, with the electronic message, at least one of:
   information indicating a name of an anti-malware engine used to scan the electronic message for malicious content;
   information about malware definitions used by the anti-malware engine.

4. The method of claim 3, wherein the information about the malware definitions used by the anti-malware engine comprises at least one of:
   a timestamp indicating when the anti-malware engine scanned the electronic message for malicious content;

version information that indicates a version of the malware definitions used by the anti-malware engine.

5. The method of claim 4, further comprising:
identifying, at the client device of the additional user, the information that indicates the version of the malware definitions used to scan the electronic message;
determining that the anti-malware engine has been updated with a new version of malware definitions since the anti-malware engine scanned the electronic message;
re-scanning, at the client device of the additional user, the electronic message for malicious content based on the determination that the anti-malware engine has been updated with a new version of malware definitions since the anti-malware engine scanned the electronic message.

6. The method of claim 1, wherein the client device of the additional user comprises at least one of:
a client device with a messaging account to which the electronic message was distributed;
an anti-malware engine responsible for scanning electronic messages received by the messaging account.

7. The method of claim 1, wherein determining that the user of the client device is attempting to distribute the electronic message comprises intercepting the electronic message before the electronic message is distributed to the client device of the additional user.

8. The method of claim 1, wherein scanning the electronic message to determine the malware status of the electronic message comprises at least one of:
identifying results of a malware scan previously performed on the electronic message;
prompting an anti-malware engine to scan the electronic message for malicious content.

9. The method of claim 1, wherein including the result of the malware scan with the electronic message comprises inserting a field containing the result of the malware scan into a header of the electronic message.

10. The method of claim 1, further comprising:
encrypting the result of the malware scan with a private key;
before the client device of the additional user uses the result of the malware scan included with the electronic message, the client device of the additional user verifies the result of the malware scan by decrypting the result of the malware scan with a public key that corresponds to the private key.

11. A system for indicating malware statuses of electronic messages, the system comprising:
a determination module, stored in memory, that determines that a user of a client device is attempting to distribute an electronic message that the user at least partially created at the client device;
a scanning module, stored in memory, that scans, at the client device of the user, the electronic message to determine a malware status of the electronic message;
an inclusion module, stored in memory, that before distributing the electronic message, includes, at the client device of the user, with the electronic message, a result of the malware scan performed on the electronic message;
a distribution module, stored in memory, that after including the result of the malware scan performed on the electronic message with the electronic message, distributes the electronic message to a client device of an additional user, where the client device of the additional user uses the result of the malware scan included with the electronic message to determine the malware status of the electronic message;
at least one processor that executes the determination module, the scanning module, the inclusion module, and the distribution module.

12. The system of claim 11, wherein the result of the malware scan performed on the electronic message indicates at least one of:
the electronic message does not contain any malicious content;
the electronic message contains potentially malicious content;
malicious content within the electronic message has been removed; and
malicious content within the electronic message has been quarantined.

13. The system of claim 11, wherein the inclusion module further includes, at the client device of the user, with the electronic message, at least one of:
information indicating a name of an anti-malware engine used to scan the electronic message for malicious content;
information about malware definitions used by the anti-malware engine.

14. The system of claim 13, wherein the information about the malware definitions used by the anti-malware engine comprises at least one of:
a timestamp indicating when the anti-malware engine scanned the electronic message for malicious content;
version information that indicates a version of the malware definitions used by the anti-malware engine.

15. The system of claim 14, further comprising:
a receiving module that identifies, at the client device of the additional user, the information that indicates the version of the malware definitions used to scan the electronic message, wherein:
the receiving module determines that the anti-malware engine has been updated with a new version of malware definitions since the anti-malware engine scanned the electronic message;
the receiving module re-scans, at the client device of the additional user, the electronic message for malicious content based on the determination that the anti-malware engine has been updated with a new version of malware definitions since the anti-malware engine scanned the electronic message.

16. The system of claim 11, wherein the client device of the additional user comprises at least one of:
a client device with a messaging account to which the electronic message was distributed;
an anti-malware engine responsible for scanning electronic messages received by the messaging account.

17. The system of claim 11, wherein the determination module determines that the user of the client device is attempting to distribute the electronic message by intercepting the electronic message before the electronic message is distributed to the client device of the additional user.

18. The system of claim 11, wherein the inclusion module includes the result of the malware scan with the electronic message by inserting a field containing the result of the malware scan into a header of the electronic message.

19. The system of claim 11, wherein:
the inclusion module encrypts the result of the malware scan with a private key;
before the client device of the additional user uses the result of the malware scan included with the electronic message, a receiving module at the client device of the additional user verifies the result of the malware scan by decrypting the result of the malware scan with a public key that corresponds to the private key.

20. A non-transitory computer-readable medium comprising one or more computer-executable instructions that, when executed by at least one processor of a computing device, cause the computing device to:
- determine that a user of a client device is attempting to distribute an electronic message that the user at least partially created at the client device;
- scan, by the client device of the user, the electronic message to determine a malware status of the electronic message;
- before distributing the electronic message, include, by the client device of the user, with the electronic message, a result of the malware scan performed on the electronic message;
- after including the result of the malware scan performed on the electronic message with the electronic message, distribute the electronic message to a client device of an additional user, where the client device of the additional user uses the result of the malware scan included with the electronic message to determine the malware status of the electronic message.

* * * * *